United States Patent [19]

Bradshaw

[11] 4,267,855
[45] May 19, 1981

[54] PNEUMATIC VACUUM REGULATOR

[75] Inventor: Cyril E. Bradshaw, Kalamazoo, Mich.

[73] Assignee: Eaton Corporation, Cleveland, Ohio

[21] Appl. No.: 112,892

[22] Filed: Jan. 17, 1980

[51] Int. Cl.³ .............................................. G05D 16/06
[52] U.S. Cl. ................................... 137/85; 137/116.5; 137/627.5; 137/DIG. 8
[58] Field of Search .......................... 60/290; 123/568; 137/85, 103, 116.5, 627.5, DIG. 8

[56] References Cited

U.S. PATENT DOCUMENTS

| 3,125,111 | 3/1964 | Daly | 137/116.5 X |
| 3,411,522 | 11/1968 | Golden | 137/116.5 |
| 3,575,190 | 4/1971 | Puster | 137/85 |
| 3,739,797 | 6/1973 | Caldwell | 137/85 |
| 3,818,923 | 6/1974 | Puster | 137/85 |
| 3,915,136 | 10/1975 | Caldwell | 123/568 |
| 4,173,204 | 11/1979 | Takayama | 123/568 |
| 4,192,453 | 3/1980 | Frankenberg | 137/85 X |

FOREIGN PATENT DOCUMENTS 897521 5/1962 United Kingdom ............ 137/627.5

Primary Examiner—Robert G. Nilson
Attorney, Agent, or Firm—R. J. McCloskey; E. C. Crist; R. A. Johnston

[57] ABSTRACT

A pneumatic vacuum regulator (10) is disclosed for supplying a modulated vacuum output signal proportional to an input pressure signal. Upper (18) and lower (20) diaphragms mounted within a housing (14, 16, 36), cooperate therewith to define a fluid chamber (46), a control chamber (58), and an atmospheric vent (104). A spacer (22) between the diaphragms allows the diaphragms to move as a unit in response to sensing subatmospheric pressure in the fluid chamber, atmospheric pressure on one side of the upper diaphragm, and fluid pressure in the control chamber. A valve member (92) is integrally molded into the upper diaphragm and is engageable with an atmospheric valve seat (96) formed around an opening (98) in an upper diaphragm plate (88). A vacuum valve seat (52) is aligned with opening (98) such that the valve member is engageable with either or both valve seats, thus permitting pressure in the fluid chamber to be modulated proportional to the pressure in the control chamber.

16 Claims, 10 Drawing Figures

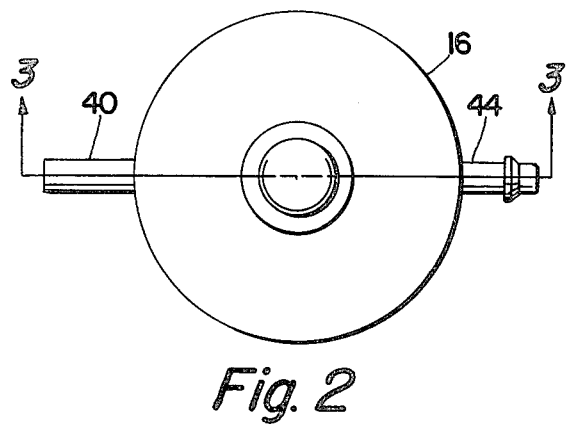
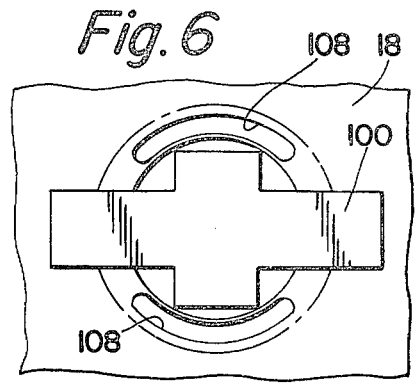
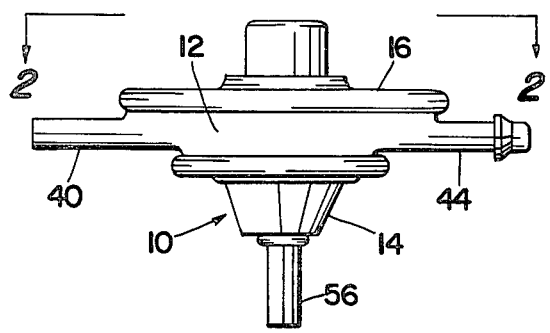
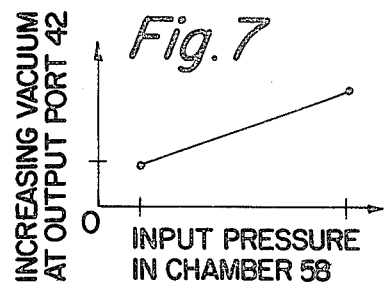
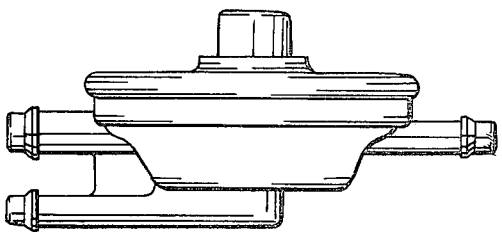
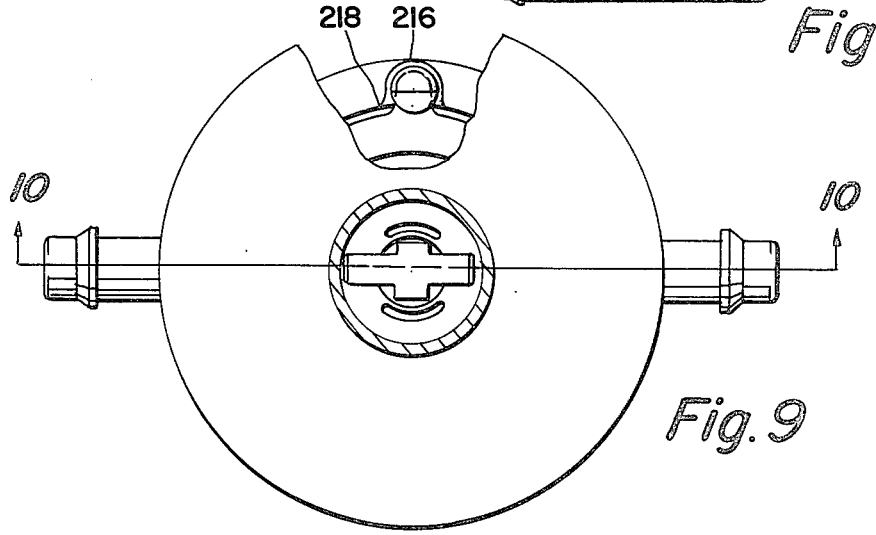

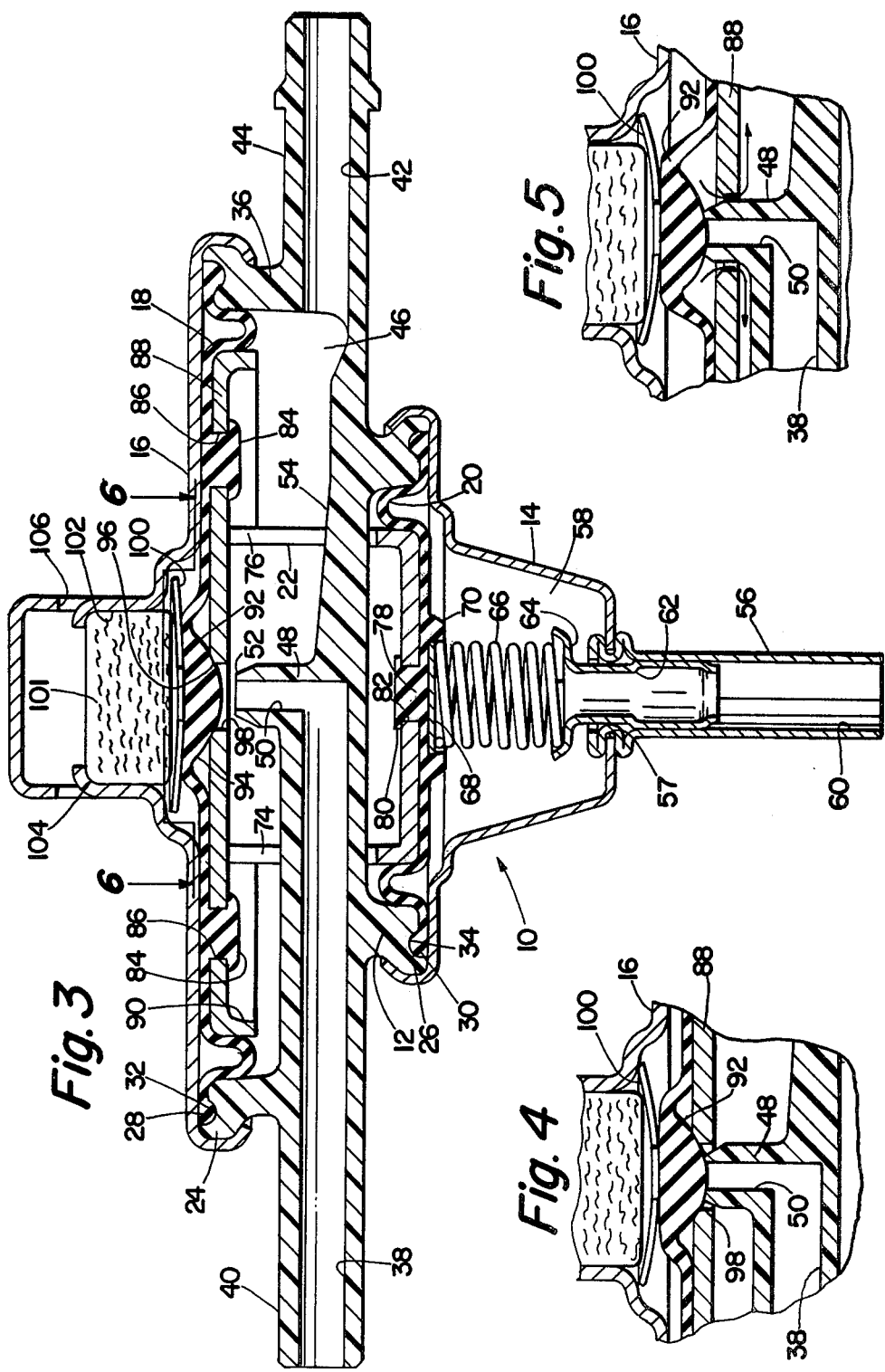

PNEUMATIC VACUUM REGULATOR

BACKGROUND OF THE INVENTION

This invention relates to pneumatically operated vacuum regulator devices which supply an inverted output pressure signal which is directly proportional to an input control pressure signal. The invention valve is particularly suitable for use in vehicle exhaust gas recirculation systems which require a device for providing a controlled output vacuum signal to a vacuum operated exhaust gas recirculation valve in response to the pressure developed by a secondary source of positive pressure proportional to engine speed.

DESCRIPTION OF THE PRIOR ART

In the art of controlling emissions of internal combustion engines used in vehicles, it has been found that in certain instances engine performance has been adversely affected by recirculation of exhaust gases during initial periods of vehicle acceleration. Where exhaust gas recirculation (EGR) response is controlled with a vacuum signal from the intake manifold or from the carburetor venturi, the control signal has been found to lead engine response, thereby resulting in the above described problem. This problem of decreased engine performance caused by premature recirculation of exhaust gases into the intake manifold can be eliminated by delaying changes in recirculation of exhaust gas into the intake manifold relative to changes in the engine throttle position.

An available control signal source which lags engine throttle response is that provided by the output pressure from an auxiliary air pump driven by the engine. Such pumps are provided typically to supply a flow of pressurized air to the engine exhaust manifold or to a catalyst where the extra oxygen in the air flow assists catalytic pollutant conversion. The output pressure from the pump can then be used to control a pneumatic regulator device for supplying to an EGR valve a vacuum signal which thereafter is directly proportional to engine r.p.m.

A pneumatically controlled vacuum regulator is known in the art which incorporates upper and lower diaphragms having differential areas mounted in a housing. A high pressure chamber is defined by the space between the diaphragms thus permitting the diaphragm assembly to move upwardly or downwardly in response to atmospheric pressure exerted on the top side of the upper diaphragm and subatmospheric pressure exerted on the bottom side of the lower diaphragm. A ball valve arrangement is mounted in an insert assembly which connects the upper and lower diaphragms. The ball valve functions in response to movement of the diaphragm assembly to vent either atmospheric air or vacuum into a low pressure output chamber. An outlet fluid port is connected in common with the low pressure chamber and the pressure therein is made available as a control signal to an EGR valve. A regulator of this particular type would be comparatively high in cost and would require a relatively high number of components parts.

There has therefore arisen a need for a low cost pneumatic regulator device which will provide a controlled output vacuum signal which is directly proportional to an input pressure signal.

SUMMARY OF THE INVENTION

In the present invention a pressure controlled vacuum regulator valve is provided having a control cavity defined by upper and lower flexible disphragms connected to a central annular housing member. A vacuum supply port and a control output vacuum port are formed by the central annular housing. Upper and lower housing shells are formed over the upper and lower edges of the housing and also sealingly engage with the periphery of each diaphragm. The axial spacing between the upper and lower diaphragms is maintained by a rigid cup-shaped spacer disposed between upper and lower rigid diaphragm plates. The area of the upper diaphragm exceeds the area of the lower diaphragm resulting in a differential area effect which causes the diaphragm assembly to move downwardly when the pressure in the cavity is below atmospheric. Atmospheric air pressure is continuously communicated against the top surface of the upper diaphragm and tends to move both diaphragms downwardly while the bottom surface of the lower diaphragm is forced upwardly by an input pressure signal above atmospheric pressure from the auxiliary air pump and a biasing force from a compression spring. Oppositely directed pressure forces acting on the diaphragms create a clamping effect on the spacer which enables the upper and lower diaphragms and spacer to move in unison.

The supply vacuum port communicates with the control cavity through an orifice which is surrounded by a valve seat. A valve member is integrally formed by the upper diaphragm and is axially aligned over the supply vacuum output orifice and the vacuum valve seat. Slots through the upper diaphragm formed outward radially from the integral valve member permit communication of atmospheric air to the space above an atmospheric valve seat defined by an orifice through a plate connected to the upper diaphragm member. The valve member is engageable with both the supply vacuum valve seat and also the atmospheric valve seat when the regulator is in an equilibrium or neutral position.

A leaf spring, disposed between the upper housing shell and the valve member, biases the valve member downwardly toward the atmospheric valve seat.

The valve member is movable in response to movement of the diaphragm assembly between a neutral position in which both supply vacuum and atmospheric air are sealed from the control cavity, a venting position in which the valve member seals the supply vacuum but is spaced from the atmospheric vent seat in the upper diaphragm plate, and a vacuum supply position in which the valve member is seated against the atmospheric vent seat and spaced from the vacuum orifice seat for communicating the control chamber with supply vacuum.

The valve functions to provide a predetermined control cavity pressure for a given pressure input from the auxiliary pump. If the pressure within the control cavity falls below the predetermined value established relative to the external pressure acting on the differential diaphragm area, the input control pressure, and the biasing spring force, the valve will automatically move to an atmospheric air venting position until the control cavity pressure rises to its design value. Similarly, an increase in control cavity pressure above the design pressure will result in the valve member being moved upwardly to a supply vacuum position in which supply vacuum is then free to communicate with the control cavity and return the pressure to the given design value. As long as the control cavity pressure remains at the design value, the valve member will remain in the neutral position. Throughout the various stages of valve operation, the upper and lower diaphragms remain compressed against their corresponding diaphragm plates, thus eliminating the need for riveting the diaphragms to the backing plates.

An alternate embodiment comparable in function to the first embodiment is disclosed having a lower housing member formed of a suitable thermoplastic material in which are integrally formed the vacuum inlet, vacuum outlet, and pressure control ports. A disc-shaped thermoplastic insert having passageways therein which align with the vacuum inlet and outlet is attached to the housing and clamps the lower diaphragm therebetween, thus providing a vacuum regulator which is low in cost and simple to assemble.

It is therefore an object of the invention to provide a pneumatically operated vacuum regulator device which provides a constant output vacuum signal in response to an input pressure signal.

It is another object of the invention to provide a pneumatic vacuum regulator device which can automatically compensate for variations in the design output pressure independently of variations in the input source pressure level.

It is another object of the invention to provide a pneumatic vacuum regulator device which is low in cost and easy to assemble.

It is another object of the invention to provide a pneumatic vacuum regulator device having a minimum number of parts.

It is still another object of the invention to provide a regulator having a valve member integrally formed by a resilient diaphragm and having a valve surface engageable with a valve seat defined by the peripheral edge of an orifice in a rigid diaphragm plate.

These and other objects, features, and advantages of the present invention will be understood in greater detail from the following description and the associated drawings wherein reference numerals are utilized in designating preferred embodiments.

BRIEF DESCRIPTION OF THE DRAWINGS

FIG. 1 is a view of a first embodiment in elevation of a regulator embodying the principles of the invention;

FIG. 2 is a top view relative to FIG. 1;

FIG. 3 is a cross-sectional view taken along section indicating lines 3—3 of FIG. 2;

FIG. 4 is a partial cross-sectional view illustrating the valve member in the neutral position; and FIG. 5 is a partial cross-sectional view illustrating the valve member in an atmospheric air venting position;

FIG. 6 is a partial view taken along section lines 6—6 of FIG. 3 illustrating the atmospheric vent passages in the upper diaphragm;

FIG. 7 is a typical plot showing the linear relationship between increasing control pressure and output vacuum;

FIG. 8 is a view in elevation of a second embodiment of the invention;

FIG. 9 is a top view relative to FIG. 8 in partial cross-section and with a portion in cross-section as taken along lines 9—9 of FIG. 10.

DETAILED DESCRIPTION

Figure 10:
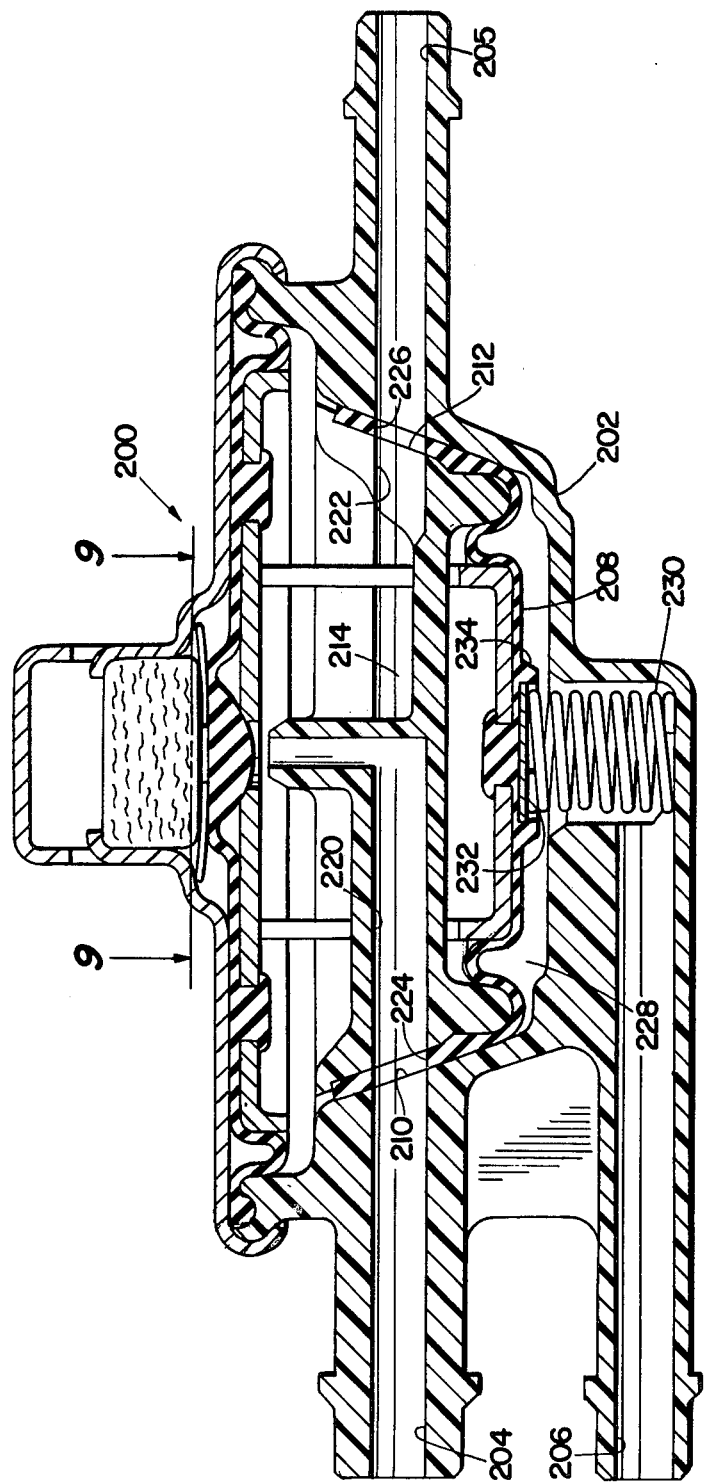
FIG. 10 is a cross-sectional view taken along section indicating lines 10—10 of FIG. 9.

Referring now to FIGS. 1—3, there is illustrated a pneumatic vacuum regulator assembly, indicated generally by 10, embodying the principles of the invention. Regulator 10 includes a central annular housing 12, a lower housing shell 14, an upper housing shell 16, an upper flexible diaphragm 18, a lower flexible diaphragm 20, and a cup-shaped diaphragm spacer 22 disposed intermediate diaphragms 18 and 20. The upper and lower housing shells are crimped over flared annular rib portions 24 and 26 of housing 12. Peripheral bead portions 28 and 30 of diaphragms 18 and 20, respectively, are seated in annular grooves 32 and 34 of housing 12 and held in sealing engagement thereagainst by the corresponding housing shells.

In the preferred form of the invention, housing 12 is molded from a suitable thermoplastic material and includes an annular side wall portion 36, a vacuum inlet port 38 defined by a tubular portion 40, and an outlet port 42 defined by a tubular portion 44. A control chamber 46 is defined by the space between diaphragms 18, 20 and the internal surface of side wall 36. Tubular portion 40 extends within chamber 46 and terminates in an upwardly extending nozzle portion 48 which defines a vertically extending outlet orifice 50. A vacuum valve seat 52, also designated as a first valve seat, is formed by the top surface of nozzle portion 48. A support rib 54 extends between the internal end of tubular portion 40 and the internal surface of wall 36.

A tubular section 56 is crimped to a centrally aligned opening 57 in lower housing shell 14 and communicates with a fluid pressure control chamber 58 defined by the lower surface of diaphragm 20 and the internal surface of housing shell 14. Tubular section 56 defines a control pressure inlet port 60 which is connectable to a pressurized source (not shown), for example, an auxiliary air pump. A tubular spring adjustment member 62 is received in press fit relationship with the internal wall of extension 56 and includes a flanged portion 64 formed on its upper end for supporting the lower end of a compression spring 66. The upper end of compression spring 66 reacts against a plate 68 seated within and centered by an annular rib portion 70 which extends from the lower surface of diaphragm 20.

Cup-shaped spacer 22 is disposed intermediate diaphragms 18 and 20 and has aligned slots 74 and 76 shown edgewise by FIG. 3 for permitting the internal portion of tubular member 40 and support rib 54 to extend therethrough.

A centrally located projection 78 having a flared rim portion 80 is formed on diaphragm 20 and extends into a central opening 82 in spacer 22. A plurality of similarly shaped projections 84 are formed on the bottom side upper diaphragm 18 and extend through openings 86 in an upper diaphragm plate 88. A downwardly extending flange portion 90 is formed on plate 88 and assists in guiding flexing of diaphragm 18. Locating projections 78, 84 in the diaphragms function primarily to maintain upper diaphragm plate 88 and spacer 22 centrally aligned relative to the diaphragms.

A centrally located button-shaped portion 92, also designated as a valve member, is integrally molded into diaphragm 18 and has a generally spherical valve surface 94 formed on the lower surface thereof. Valve surface 94 is shown in FIG. 3 as seated against a chamfered surface 96 formed around an opening 98 in diaphragm plate 88. Chamfered surface 96 is also designated as an atmospheric valve seat.

As shown by FIGS. 3 and 6, a leaf spring 100 is positioned between an internal shoulder portion of upper housing shell 16 and the top surface of valve member 92 and functions to bias valve member 92 downwardly toward vacuum valve seat 52 and atmospheric valve seat 96.

A porous filter element 101 is received in a cylindrical bore 102 formed by the upper portion of housing shell 16. Tabs 104 are stamped through the wall of housing shell 16 and function to position filter element 101. Atmospheric air vent passages 106 are defined as a result of forming tabs 104 and permit atmospheric air flow through filter 101 to the space above upper diaphragm 18.

As shown by FIG. 6, a pair of arcuate vent slots 108 are formed into upper diaphragm 18 adjacent the outer periphery of valve member 92 and permit atmospheric air to enter the space beneath upper diaphragm 18 and the top surface of diaphragm plate 88.

In operation, vacuum inlet port 38 is connected to an engine vacuum source (not shown), pressure supply port 60 is connected to an engine auxiliary air pump (not shown), and outlet port 42 is connected to a device to be controlled by a subatmospheric pressure signal as, for example, an exhaust gas recirculation valve (not shown). For a given supply pressure communicated to chamber 58 through port 60, the vacuum regulator device 10 will function to achieve a predetermined control cavity pressure whereupon valve member 92 will be in fluid sealing engagement with atmospheric valve seat 96 and vacuum valve seat 52 as shown by FIG. 3. In the FIG. 4 position, designated as a neutral position, the total upward force acting upon spacer 22 from the differential pressure across lower diaphragm 20 and spring 66 is balanced by the downward force exerted on diaphragm 18 from the differential pressure represented by atmospheric air pressure and the pressure in fluid chamber 46. Leaf spring 100 also contributes a slight downward force. If the pressure in fluid chamber 46 falls below a designated design value, a force imbalance condition occurs in which the downward force exerted upon diaphragm 18 exceeds the resultant upward force acting upon lower diaphragm 20. Both diaphragms then move downwardly, resulting in valve member 92 seating and abutting against vacuum valve seat 52. Since upper diaphragm 18 and valve member portion 92 are not attached to plate 88 in the area around atmospheric valve seat 96, plate 88 is free to move away from valve member 92, thereby spacing valve surface 94 from atmospheric valve seat 96. Atmospheric air is then free to flow into fluid chamber 46 until a force balance condition is once again reached. FIG. 5 illustrates the position of the valve member relative to atmospheric vent seat 96 and vacuum valve seat 52 during atmospheric venting. The arrows of FIG. 5 show the path of atmospheric air flow.

If the control cavity pressure rises above the predetermined design value for a given input pressure to pressure control chamber 58, the upper diaphragm will move upwardly whereupon valve member 92 is spaced from vacuum valve seat 52 but remains seated against atmospheric valve seat 96, thereby permitting the excessive pressure in control chamber 46 to vent through orifice 50 and inlet 38 toward the vacuum source. This position is shown by FIG. 3.

When the control cavity pressure has returned to the predetermined design value for a given air pressure in chamber 58, the diaphragms and the valve member will once again return to the neutral position. FIG. 7 is a typical plot of control outlet vacuum at port 42 versus control pressure at inlet 60 which illustrates the linearity of regulator response.

It should be noted that throughout valve operation the upper and lower diaphragms are constantly being compressed toward chamber 46, thereby eliminating any need for additional fastening means between the diaphragm 18 and plate 88 and also spacer 22 and diaphragm 20, thus significantly reducing the cost of the assembly.

Vacuum regulator valve 10 is calibrated by connecting vacuum inlet port 38 to a predetermined pressure below atmospheric pressure, and permitting atmospheric air pressure into pressure control chamber 58. The position of spring adjustment member 62 is adjusted upwardly or downwardly by a suitable tool (not shown) until a predetermined output vacuum is attained at outlet port 42.

Referring now to FIGS. 7-10, an alternate embodiment of the invention is indicated generally at 200. Vacuum regulator valve 200 functions in a manner identical to valve 10 and comprises a lower housing member, indicated generally at 202, having a vacuum inlet port 204, a pressure inlet port 206, and an outlet port 205 molded integrally therewith. Inlet port 204 and pressure inlet port 206 are aligned on the left side of valve 200 for facilitating connection to appropriate fluid lines (not shown).

A lower diaphragm 208 is clamped between a tapered inner wall 210 of housing 202 and a tapered outer wall 212 of a housing insert 214 which is attached to housing 202 by screws 216 (FIG. 9) which extend through radial projections 218 of the insert. In the preferred form of the invention, insert 214 is molded from a suitable thermoplastic material. Radially extending passageways 220 and 222 are formed in insert 214 and aligned with ports 204 and 205, respectively, as are openings 224 and 226 in lower diaphragm 208. A pressure control chamber 228, corresponding to chamber 58 of FIG. 3, is formed by the lower surface of diaphragm 208 and housing 202.

A biasing spring 230 has a lower end seated against housing 202 and an upper end reacting against a plate 232 pressed within a circular bore defined by an annular rib 234 formed on the bottom side of diaphragm 208.

The remaining components of valve 200 are identical in construction and function to those described above for valve 10, and as such, need not be described again.

The embodiments of the invention as shown and described above are representative of the inventive principles stated herein. It is to be understood that variations and departures can be made from the embodiments as shown without, however, departing from the scope of the appended claims.

What is claimed is:

1. A fluid pressure signal converter comprising:
   (a) housing means defining a sealed cavity therein, said housing means defining a signal inlet port communicating with said cavity and adapted for connection to a positive gauge pressure signal and a fluid pressure source port adapted for connection to a source of negative gauge pressure, said housing means further defining an atmospheric vent and a signal output port adapted for connection to a device controlled by a negative gauge fluid pressure signal;

(b) differential pressure responsive transducer means movably disposed within said cavity and including first and second spaced diaphragms defining within said cavity:
  (i) a positive pressure chamber communicating only with said signal inlet port;
  (ii) a negative pressure chamber communicating with said source port and said signal output port with said diaphragms forming opposite walls of said negative pressure chamber;
  (iii) structure defining a valve seat stationary with respect to said housing means and a valve member movable with respect thereto for controlling fluid flow through said source port;
  (iv) means defining a bleed port communicating said vent port with said negative pressure chamber,
  (v) said valve member being movable with respect to said bleed port for controlling flow therethrough wherein, for a given positive pressure input signal, said transducer means moves to modulate flow through said valve seat and said bleed port to maintain said negative pressure output signal substantially constant.

2. The device as defined in claim 1, wherein
(a) said bleed port means includes a rigid plate connected to said first diaphragm, said plate having an opening therein and an atmospheric valve seat formed around the periphery of said opening;
(b) said valve member defined by an integral portion of said first diaphragm, said first diaphragm including a thin wall flexible portion surrounding said valve member;
(c) said first diaphragm connected to said rigid plate outward radially from said opening; and
(d) said valve member having a thickness substantially greater than said thin wall flexible portion, said valve member having a lower valve surface sealingly engageable around said bleed port, said valve member freely movable toward or away from said bleed port.

3. The device as defined in claim 1, wherein said pressure transducer means includes a cup-shaped spacer member disposed intermediate said first and second diaphragms, said spacer having a lower surface portion in contact with said second diaphragm.

4. The device as defined in claim 1, wherein said housing means includes
(a) an annularly shaped member formed of a thermoplastic material and having said first and second diaphragms connected thereacross;
(b) inlet fluid port means defined by a tubular portion extending radially inwardly from the internal wall of said annular member and terminating within said fluid chamber in an upwardly extending nozzle portion; and
(c) said stationary valve seat is defined by an end surface formed on the upper end of said nozzle portion.

5. The device as defined in claim 1, wherein said vent port means includes a fluid passageway formed through said first diaphragm, said valve member integrally formed by said first diaphragm, said fluid passageway located radially outwardly from the periphery of said valve member portion.

6. The device as defined in claim 1, wherein
(a) said first diaphragm has a first effective force transmitting area;
(b) said second diaphragm has a second effective force transmitting area less than said first effective area; and further including,
(c) a biasing spring disposed in said positive pressure chamber and having one end thereof reacting against said second diaphragm and the other end thereof reacting against housing means.

7. The device as defined in claim 1, wherein said housing means includes
(a) an annularly shaped outer member having a tapered, internal wall portion; and
(b) a disc-shaped insert member received within and connected to said outer member, said insert member having an outer, tapered surface portion conformable with said internal wall portion, said second diaphragm clamped around its periphery between said internal wall portion and said outer surface portion.

8. The device as defined in claim 7, wherein
(a) said insert member has a first internal fluid port formed therein, said fluid port including a first radially extending portion and a second vertically extending portion, said insert member has a second radially extending fluid port formed therein; and,
(b) said outer member having first and second radially extending fluid ports formed therethrough and aligned with said first and second fluid ports in said insert member, respectively.

9. A fluid pressure controlled vacuum regulator, said regulator valve comprising:
(a) housing means, said housing means defining a cavity therewithin,
(b) pressure responsive means disposed within said cavity, said pressure responsive means including
  (i) first resilient diaphragm means,
  (ii) second resilient diaphragm means disposed beneath said first diaphragm, said first diaphragm means having an effective force transmitting area greater than said second diaphragm,
  (iii) said first and second diaphragm means defining in cooperation with said housing means a fluid chamber,
  (iv) means disposed intermediate said first and second diaphragms and operable to transmit from one to the other movement with respect to said housing means;
(c) said housing means further including
  (i) means defining an inlet fluid port communicating with said fluid chamber, said inlet fluid port defining means further defining a first valve seat disposed within said control chamber, said inlet fluid port adapted for connection to a sub-atmospheric pressure source,
  (ii) means defining an outlet fluid port communicating with said fluid chamber,
  (iii) means for communicating atmospheric air to said first diaphragm exteriorly of said fluid chamber,
(d) said first diaphragm means including
  (i) means defining a valve member portion integrally formed thereby,
  (ii) means defining a vent permitting atmospheric air through said first diaphragm means;
(e) atmospheric valve seat means movable with said pressure responsive means;

(f) means for biasing said valve toward said first valve seat and toward said atmospheric valve seat means;

(g) means defining a control chamber bounded by said second diaphragm means and said housing means, said control chamber defining means including means defining a fluid port adapted for connection to a control pressure source;

(h) means for biasing said second diaphragm means in a direction toward said first diaphragm means; and (j) said housing means including means defining a fluid port adapted for connection to a fluid pressure source for receiving a pressure control signal therefrom, said pressure responsive means movable between a first position in which said valve means is seated against said atmospheric valve seat and spaced from said first valve seat whereupon the pressure in said fluid chamber is reduced, a second position in which said valve means is seated against said first valve seat and said atmospheric valve seat whereupon said fluid chamber is isolated from the atmosphere and said sub-atmospheric source, and a third position in which said valve member is spaced from said atmospheric valve seat and seated against said first valve seat whereupon said fluid chamber is vented to the atmosphere and isolated from said sub-atmospheric source, said pressure responsive means movable to said first position upon the pressure in said fluid chamber rising above a predetermined value proportional to said control pressure in said control chamber, said pressure responsive means movable to said third position upon the pressure in said fluid chamber falling below said predetermined value, and said pressure responsive means movable to said second position upon the pressure in said fluid chamber remaining at said predetermined value.

10. The device as defined in claim 9, wherein (a) said atmospheric valve seat means includes a rigid plate located on said fluid chamber side of said first diaphragm means and having an opening therein and an atmospheric valve seat formed around the periphery of said opening;

(b) said first diaphragm means includes a thin wall flexible portion surrounding said integral valve member portion;

(c) said first diaphragm means connected to said rigid plate outward radially from said opening; and (d) said valve member portion having a thickness substantially greater than said thin wall flexible portion, said valve member portion having a lower valve surface sealingly engageable with said atmospheric valveseat, said valve member portion freely movable toward or away from said atmospheric valve seat.

11. The device as defined in claim 9, wherein said spacer means is a cup-shaped member disposed intermediate said first and second diaphragm means, said cup shaped member having a lower surface portion in contact with said second diaphragm.

12. The device as defined in claim 9, wherein (a) said housing means includes a generally annularly shaped member formed of a thermoplastic material and having said first and second diaphragm means connected thereacross;

(b) said inlet fluid port means is defined by a tubular portion extending radially inwardly from the internal wall of said annular member and terminating within said fluid chamber in an upwardly extending nozzle portion; and (c) said first valve seat is defined by an end surface formed on the upper end of said nozzle portion.

13. The device as defined in claim 9, wherein said means for venting atmospheric pressure past said first diaphragm means includes said first diaphragm having a fluid passageway formed therethrough located radially outwardly from the periphery of said valve member portion.

14. The device as defined in claim 9, wherein (a) said first diaphragm means has a first effective force transmitting area;

(b) said second diaphragm means has a second effective force transmitting area less than said first effective area; and (c) said means for biasing said second diaphragm means is a spring disposed in said control chamber and having one end thereof reacting against said second diaphragm and the other end thereof reacting against housing means.

15. The device as defined in claim 9, wherein said housing means includes (a) a generally annularly shaped outer member having a tapered, internal wall portion; and (b) said inlet fluid port means includes a generally disc-shaped insert member received within and connected to said outer member, said insert member having an outer, tapered surface portion conformable with said internal wall portion, said second diaphragm clamped around its periphery between said internal wall portion and said outer surface portion.

16. The device as defined in claim 15, wherein (a) said insert member has a first internal fluid port formed therein, said fluid port including a first radially extending portion and a second vertically extending portion, said insert member has a second radially extending fluid port formed therein; and, (b) said outer member having first and second radially extending fluid ports formed therethrough and aligned with said first and second fluid ports in said insert member, respectively.

* * * * *